United States Patent [19]
Koishi et al.

[11] Patent Number: 5,808,746
[45] Date of Patent: Sep. 15, 1998

[54] PHOTODETECTOR APPARATUS

[75] Inventors: Musubu Koishi; Kouichi Shirakawa; Manabu Yasukawa; Hirotoshi Terada, all of Hamamatsu, Japan

[73] Assignee: Hamamatsu Photonics K.K., Hamamatsu, Japan

[21] Appl. No.: 781,812

[22] Filed: Jan. 9, 1997

[30] Foreign Application Priority Data

Feb. 28, 1996 [JP] Japan .................................. 8-041802

[51] Int. Cl.$^6$ .................................................. G11B 7/125
[52] U.S. Cl. .......................................... 356/445; 369/122
[58] Field of Search ............................. 356/445; 257/98; 372/31; 369/106, 120, 121, 122

[56] References Cited

U.S. PATENT DOCUMENTS 4,789,881 12/1988 Alphonse .................................. 257/98
5,563,710 10/1996 Webb et al. ............................. 356/445

OTHER PUBLICATIONS

Optics Commnications, vol. 17, No. 1, Apr. 1976, Self-Coupled Optical Pickup, Y.Mitsuhashi et al. pp. 95–97.
Optical Communication Handbook, Aug. 1984, pp. 610–611.
Optics Communications 109 (1994) pp. 167–177 Compact Confocal Interference Microscopy, R. Juskaitis et al 15 Jun. 1994.
Optics Letters Jul. 15, 1993/vol. 18, No. 14, pp. 1135–1137, Spatial Filtering by Laser Detection in Confocal Microscopy, R. Juskaitis et al.

Primary Examiner—Richard A. Rosenberger
Attorney, Agent, or Firm—Cushman Darby & Cushman, IP Group of Pillsbury Madison & Sutro LLP

[57] ABSTRACT

A semiconductor light amplifier device emits, from an exit end processed to yield no reflection, outgoing light with a light quantity corresponding to a driving signal input from a driving circuit. This outgoing light irradiates, by way of an optical system, an object to be measured; whereas the reflected light, scattered light, and diffracted light generated by the object trace back the optical system and are made incident on the exit end of the semiconductor light amplifier device in a feedback manner as return light. Accordingly, the light amplifier device performs optical amplification as the return light is incident thereon, thereby increasing the light quantity of the outgoing light. This change in light quantity of the outgoing light is detected by the light-receiving device and output therefrom as a light-receiving signal. Thus, as the relationship between the driving signal and light quantity of the outgoing light in the semiconductor light amplifier device changes in response to the light quantity of the return light, an optical characteristic of the object is measured. Therefore, a photodetector apparatus can be obtained, in which, as noise caused by the return light is suppressed, a high S/N ratio and a wide dynamic range are attained while a high-speed response is enabled.

17 Claims, 12 Drawing Sheets

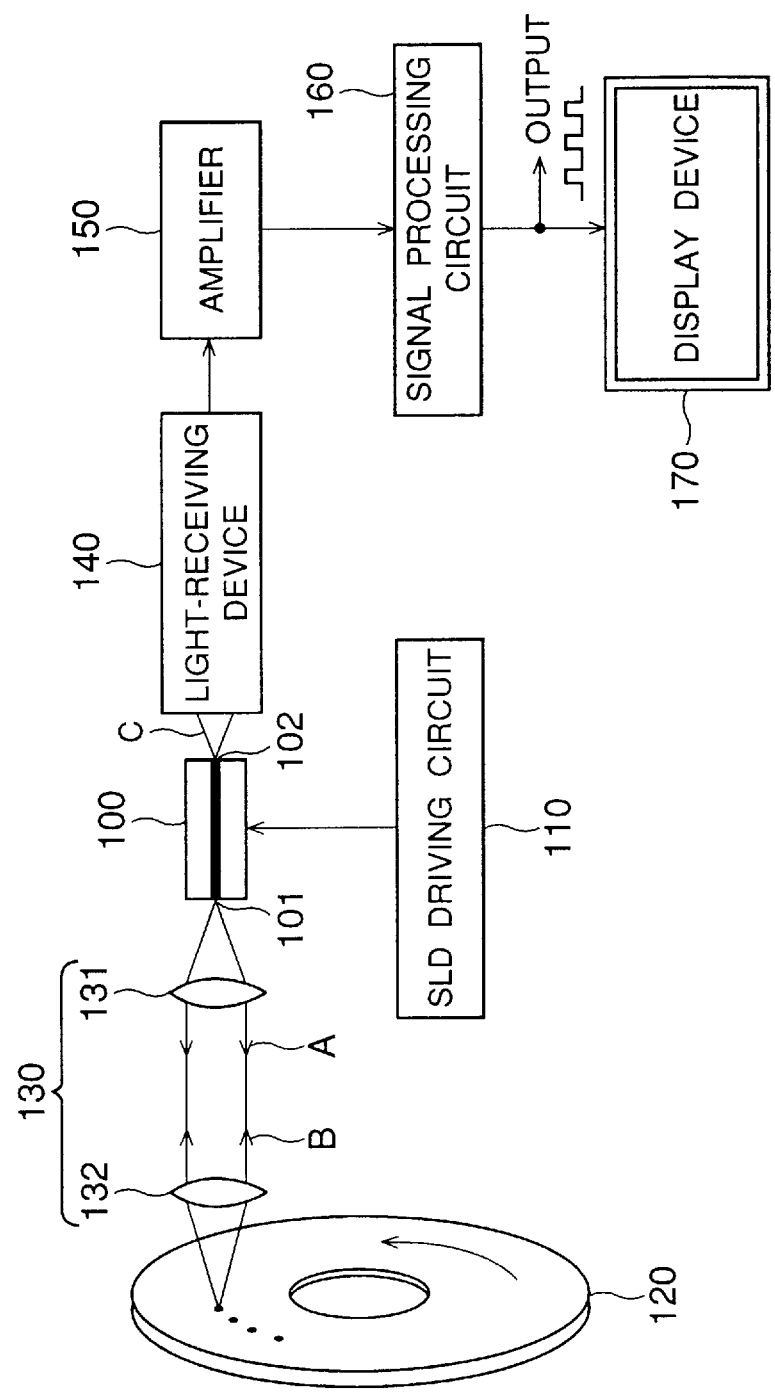

PHOTODETECTOR APPARATUS

BACKGROUND OF THE INVENTION

1. Field of the Invention

The present invention relates to a photodetector apparatus which detects an optical characteristic of an object to be measured on the basis of a change in optical intensity of outgoing light from a light-emitting device induced by return light from the object.

2. Related Background Art

In the case where a certain material is irradiated with light emitted from a laser resonator, and then a part of the light is reflected by the material and made incident on the laser resonator in a feedback manner; even when its relative feedback amount is quite small, a large change occurs in laser characteristics such as output light intensity and oscillation wavelength. This fluctuation in characteristics induced by the return light from the outside of the laser resonator remarkably occurs in semiconductor lasers, in particular, thereby yielding a large obstacle to various applications in terms of increase in noise and the like. Accordingly, when a semiconductor laser is used in optical communications and optical measurement, an optical isolator is used so as to prevent the return light from being fed back to the semiconductor laser.

On the other hand, there is a technique called "laser feedback optical detection technique" in which the phenomenon mentioned above is positively utilized such that a predetermined object is irradiated with the outgoing light of the semiconductor laser, and then an optical characteristic of this material is detected and measured on the basis of a change in the outgoing light intensity which occurs when the reflected light, scattered light, or diffracted light returning from the material is fed back to the semiconductor laser. In the following, the principle of operation of this laser feedback optical detection technique will be explained.

When an object to be measured is irradiated, by way of an optical system constituted by a lens and the like, with light emitted from one exit end (front face) of a semiconductor laser to which a constant current is supplied by a constant-current regulated power source, a part of the light reflected and scattered by the object or the like passes through the lens again to be made incident on the exit end of the semiconductor laser in a feedback manner. Here, the light incident on the semiconductor laser in a feedback manner is called "return light."

Due to this return light, the optical intensity of the outgoing light from the semiconductor laser changes. In general, when the current injected into the semiconductor laser is made constant, the optical intensity of the outgoing light from the semiconductor laser increases as the return light is greater.

At the other end (rear face) of the semiconductor laser, a photodiode, for example, is disposed as photodetector. To this photodiode, a predetermined voltage is applied by a constant-voltage regulated power source.

Accordingly, the outgoing light of the semiconductor laser, whose optical intensity has been changed by the return light thereto, is incident on the photodiode, whereby a photoelectric current corresponding to this optical intensity is generated. Then, this photoelectric current is detected by a current detector connected to the photodiode.

Therefore, from the output signal of the photodiode, the change in optical intensity of the outgoing light from the semiconductor laser can be detected, whereby the light quantity of the return light can be measured, and optical characteristics of the object to be measured can be further measured.

Thus, as compared with a technique where the intensity of the light reflected and scattered by the object to be measured or the like is directly detected, the laser feedback optical detection technique is characteristically quite simple in terms of the optical configuration since an optical isolator for suppressing the return light to the semiconductor laser which is used as a light source, a light-splitting means for guiding the light reflected or scattered by the object to be measured or the like so as to make it incident on the photodetector, a pinhole plate for preventing noise from entering into the photodetector, and the like are unnecessary.

Accordingly, this technique has been considered to be promising and studied as a pickup technique for optical disks where it is necessary for optical systems to have an extremely simple configuration and small size (see Hisayoshi Yanai, ed., *Hikari Tshusin Handobukku* (*optical Communications Handbook*), (Tokyo: Asakura Shoten, 1984), pp. 610–611 and Y. Mitsuhashi, et al., *Optics Communications*, April 1976, Vol. 17, No. 1, pp. 95–97).

Also, though different from the above-mentioned use, a research group of the Oxford University recently reported that favorable results were obtained when the laser feedback optical detection technique was applied to a confocal laser scanning microscope (see R. Juskaitis, et al., *Optics Communications*, 109 (1994) pp. 167–177 and R. Juskaitis, et al., *Optics Letters*, July 1993, Vol. 18, No. 14, pp. 1135–1137). Here, since an intrinsic characteristic of the laser feedback optical detection technique is utilized, in principle, the light-emitting point and the light-receiving point are identical to each other, thereby making it advantageous in that a confocal optical system can be constituted in a very simple manner when a microscope is used in a converging optical system.

SUMMARY OF THE INVENTION

In general, semiconductor lasers have an end-face reflectance as low as about 0.3 and a resonator length of about several hundreds of $\mu$m which is remarkably shorter than that of the other types of laser light sources. Accordingly, the laser feedback technique tends to be affected even by slight return light, thereby increasing noise.

This increase in noise by return light includes:

(1) increase in intrinsic quantum noise of the semiconductor laser at a specific frequency region due to a change in the spectrum of the outgoing light which occurs as influenced by the return light and (2) increase in noise at the whole low-frequency region not greater than several hundreds of MHz due to the laser oscillation made unstable as influenced by the return light. The noise of the former becomes a problem to be solved mainly in optical communications and the like, while the noise in the latter becomes a problem to be solved in order to detect the return light when a large change in light quantity is accompanied therewith. Of these types, the noise of the latter becomes problematic in the laser feedback optical detection technique.

For example, in the case where the laser feedback optical detection technique is applied to a pickup technique for optical disks, confocal laser scanning microscope, and the like; when it is used in a single-mode oscillation state, interference noise occurs due to a change in optical path length; whereas, when it is used in a multi-mode oscillation state, a mode-transformation noise occurs. These noises become a large obstacle when this technique is to be practically used.

Accordingly, measures against noise, such as stabilization of a single mode and realization of a multi-mode with less mode-transformation noise, have been studied in various aspects as methods for reducing noise generated due to the laser oscillation which has been made unstable as influenced by return light. Though depending on the operational condition of the semiconductor laser, the noise level obtained by any of these methods is about 1% to 10% of the average outgoing light intensity, however. Namely, noise is not reduced so sufficiently that the laser feedback optical detection technique can be used when return light having a wide range of about 100% to 0.01% is to be measured.

Further, as a method for reducing noise when the laser feedback optical detection technique is used, there can be used a method in which the semiconductor laser is modulated with a predetermined frequency, the return light is received by a photodetector such as photodiode, and then detected by a synchronous detector means such as lock-in amplifier, so as to improve S/N ratio. Since the frequency of the lock-in amplifier is about 100 kHz at the most, high-speed response cannot be expected, however. Also, since the apparatus becomes complicated and expensive, it cannot be practically used for the above-mentioned pickup technique for optical disks and the like.

The object of the present invention is to suppress the noise occurring due to return light, thereby providing a photodetector apparatus which has a high S/N ratio and a wide dynamic range, while enabling high-speed response.

In order to attain such an object, the photodetector apparatus of the present invention comprises (1) a first driving circuit which outputs a first driving signal; (2) a semiconductor light amplifier device which emits, from a first exit end processed to yield no reflection, a first light beam having a light quantity corresponding to the first driving signal input from the first driving circuit, and optically amplifies the first light beam based on a second light beam which is incident on the first exit end in a feedback manner as return light from an object to be measured which is irradiated with the first light beam; (3) an optical system which irradiates the object with the first light beam incident thereon from the semiconductor light amplifier device, and makes the second light beam, which is incident thereon from the object, incident on the semiconductor light amplifier device in a feedback manner; and (4) a light-receiving device which detects a third light beam emitted from the semiconductor light amplifier device with a light quantity in proportion to the light quantity of the first light beam, and outputs a light-receiving signal corresponding to the light quantity of the third light beam.

Such a photodetector apparatus operates in the following manner. The semiconductor light amplifier device into which the first driving signal output from the first driving circuit has been input outputs, from its exit end which has been processed to have no reflection, outgoing light with a light quantity corresponding to this driving signal. By way of the optical system, this outgoing light irradiates the object to be measured; whereas the reflected light, scattered light, or diffracted light generated by the object upon this irradiation traces back the optical system so as to be made incident on the exit end of the semiconductor light amplifier device as return light. Accordingly, upon receiving this return light, the semiconductor light amplifier device performs optical amplification, thereby increasing the light quantity of the outgoing light. This change in light quantity of the outgoing light is detected by the light-receiving device and output as a light-receiving signal. Thus, as the relationship between the driving signal and light quantity of outgoing light in the semiconductor light amplifier device changes in response to the light quantity of the return light, optical characteristics of the object can be measured.

Preferably, in the photodetector apparatus of the present invention, the optical system has a polarization selecting system which selectively transmits therethrough a predetermined polarization component included in each of the first and second light beams, and selectively sets the oscillation mode of optical amplification which is effected by the semiconductor light amplifier device due to the second light beam incident thereon in a feedback manner. Desirably, in this case, the polarization selecting system comprises a polarizing filter made of a birefringent crystal. In such a photodetector apparatus, since one of transverse modes of the outgoing light from the semiconductor light amplifier device is selected by the polarization selecting system, the problem of astigmatic difference which is intrinsic to the semiconductor light amplifier device is overcome. Therefore, measurement can be performed with an excellent positional resolution regarding the depth direction of the object to be measured.

Also, preferably in the photodetector apparatus of the present invention, the semiconductor light amplifier device is a light-emitting device having a gain-waveguide type stripe structure or narrow stripe structure whose carrier density is localized at the center portion of the device. Desirably, in this case, the semiconductor light amplifier device is a superluminescent diode. Desirably, the semiconductor light amplifier device has a slant optical waveguide structure in which the direction of the optical waveguide is set so as to be tilted with respect to the direction of the resonator. Desirably, the semiconductor light amplifier device has a cut-off optical waveguide structure forming an optical waveguide which is away from the first exit end.

Also, preferably in the photodetector apparatus of the present invention, the first driving circuit supplies a constant injection current to the semiconductor light amplifier device as the first driving signal. Desirably, in this case, the photodetector apparatus further comprises an amplifier for amplifying the light-receiving signal input from the light-receiving device; and a signal processing circuit for generating, based on the light-receiving signal amplified by the amplifier, data concerning storage information or structure information of the object to be measured. In such a photodetector apparatus, optical characteristics of the object to be measured are measured on the basis of the light-receiving signal output from the light-receiving device.

Also, preferably, in the photodetector apparatus of the present invention, the first driving circuit adjusts, based on the light-receiving signal input from the light-receiving device, the injection current supplied to the semiconductor light amplifier device as the first driving signal, so as to constantly maintain the light quantity of the first light beam emitted from the semiconductor amplifier device. Desirably, in this case, the photodetector apparatus further comprises an amplifier for amplifying the first driving signal input from the first driving circuit; and a signal processing circuit for generating, based on the first driving signal amplified by the amplifier, data concerning storage information or structure information of the object to be measured. In such a photodetector apparatus, optical characteristics of the object to be measured are measured on the basis of the driving signal output from the light-receiving device.

Also, preferably, in the photodetector apparatus of the present invention, the light-receiving device detects, as the third light beam, the light beam emitted from the second exit end which is opposed to the first exit end in the semiconductor light amplifier device. Also, preferably in the photodetector apparatus of the present invention, the light-receiving device detects, as the third light beam, a part of the first light beam emitted from the semiconductor light amplifier device. Desirably, in this case, the optical system comprises a half mirror which is disposed in an optical path between the semiconductor device and the object to be measured, so as to guide to the light-receiving device a part of the first light beam emitted from the semiconductor light amplifier device.

Further, preferably, the photodetector apparatus of the present invention further comprises an amplifier for amplifying the light-receiving signal input from the light-receiving device or the first driving signal input from the first driving circuit; and a signal processing circuit for generating, based on the light-receiving signal or first driving signal amplified by the amplifier, data concerning storage information or structure information of the object to be measured. Desirably, in this case, the photodetector apparatus further comprises a second driving circuit which outputs a second driving signal; an actuator which adjusts, based on the second driving signal input from the second driving circuit, the focal position of an objective lens included in the optical system; and a controller which controls respective operations of the first and second driving circuits, and outputs the positional information of the object to be measured to the signal processing circuit.

More desirably, the photodetector apparatus further comprises a displacement sensor which measures displacement of the objective lens and outputs a detection signal thereof to the second driving circuit, while the second driving circuit adjusts, based on the detection signal input from the displacement sensor, the second driving signal, so as to effect a displacement error compensation for the objective lens. Also, more desirably, the photodetector apparatus further comprises a third driving circuit which outputs a third driving signal; and a stage which adjusts, based on the third driving signal input from the third driving circuit, the position of the object to be measured; while the controller further controls the operation of the third driving circuit.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a block diagram showing the configuration of the first embodiment of the photodetector apparatus in accordance with the present invention;

DESCRIPTION OF THE PREFERRED EMBODIMENTS

Figure 2A:
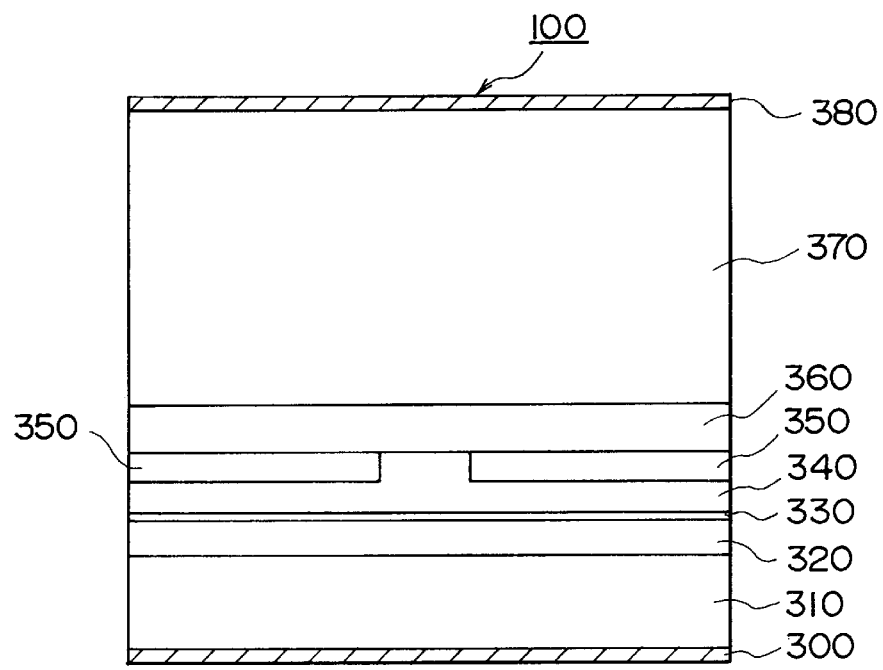
FIG. 2A is a cross-sectional view showing the configuration of a superluminescent diode (SLD) in the photodetector apparatus of FIG. 1 perpendicular to the direction of a resonator.

In the following, configurations and operations of various embodiments concerning the photodetector apparatus in accordance with the present invention will be explained in detail with reference to FIGS. 1 to 14. Here, in explanation of drawings, elements identical to each other are referred to with marks identical to each lip other without their overlapping explanations being repeated. Also, ratios of sizes in the drawings do not always coincide with those explained.

First Embodiment

To begin with, the first embodiment concerning the photodetector apparatus of the present invention will be explained. FIG. 1 is a block diagram showing the configuration of this embodiment. This embodiment is a photodetector apparatus suitably utilized, for example, in an optical pickup apparatus used for reading out optical disks.

As shown in FIG. 1, this photodetector apparatus comprises (1) a superluminescent diode 100 (referred to as "SLD" hereinafter) having an exit end 101, from which outgoing light is emitted, processed to yield no reflection; (2) an SLD driving circuit 110 which supplies a driving signal to the SLD 100 so as to drive the latter; and (3) an optical system 130 which converges forward outgoing light A emitted from one exit end 101 of the SLD 100 and irradiates therewith an object 120 to be measured, while converging the reflected light, scattered light, or diffracted light from the object 120 so as to make it incident on the exit end 101 of the SLD 100 in a feedback manner.

This photodetector apparatus further comprises (4) a light-receiving device 140 which receives backward outgoing light C emitted from the other exit end 102 of the SLD 100; (5) an amplifier 150 which converts a current signal output from the light-receiving device 140 into a voltage signal and amplifies this voltage signal; (6) a signal processing circuit 160 which effects a predetermined signal processing on the basis of the voltage signal output from the amplifier 150; and (7) a display device 170 which displays results of the signal processing in the signal processing circuit 160.

Here, the SLD 100 is a semiconductor light amplifier of gain waveguide type having a light-amplifying function caused by the light incident on the exit end 101 from the outside. Also, the optical system 130, which is constituted by a collimator lens 131 and an objective lens 132, infinitely corrects the bundle of rays between these two lenses.

In this photodetector apparatus, the forward outgoing light A emitted from the exit end 101 of the SLD 100 in response to the driving signal, i.e., constant injected current, output from the SLD driving circuit 110 is turned into a parallel bundle of rays by the collimator lens 131 and then converged by the objective lens 132 so as to irradiate a predetermined position of the object 120. The object 120 is, for example, an optical disk, whereby the forward outgoing light A is reflected, scattered, or diffracted according to pits at positions irradiated therewith. The light reflected, scattered, or diffracted by the object 120 is converged by the objective lens 132 and, by way of the collimator lens 131, is made incident on the exit end 101 of the SLD 100 as return light B.

When the return light B is incident on the SLD 100, the intensity of the forward outgoing light A emitted from the exit end 101 of the SLD 100 changes according to the light-amplifying function of the SLD 100. Also, the light quantity of the backward outgoing light C, which is output from the exit end 102 of the SLD 100 opposite to the exit end 101, is in proportion to the light quantity of the forward outgoing light A. The backward outgoing light C is received by the light-receiving device 140 and converted into a current signal corresponding to the intensity thereof. In the amplifier 150, the current signal output from the light-receiving device 140 is converted into a voltage signal and amplified. This voltage signal is subjected to a predetermined signal processing in the signal processing circuit 160, and the results thereof are displayed on the display device 170.

For example, in the case where the object 120 is an optical disk storing audio information, the current signal output from the light-receiving device 140 corresponds to a digital data sequence stored in the optical disk, whereby the signal processing circuit 160 preferably generates an electric signal which drives the display device 170, which is a speaker in this case, on the basis of this digital data sequence.

In the case where the object 120 is an optical disk storing image information, on the other hand, since the current signal output from the light-receiving device 140 corresponds to a digital data sequence stored in the optical disk, whereby the signal processing circuit 160 preferably generates an image signal to be displayed on the display device 170 which is a CRT (Cathode-Ray Tube) display in this case, on the basis of this digital data sequence.

Figure 2B:
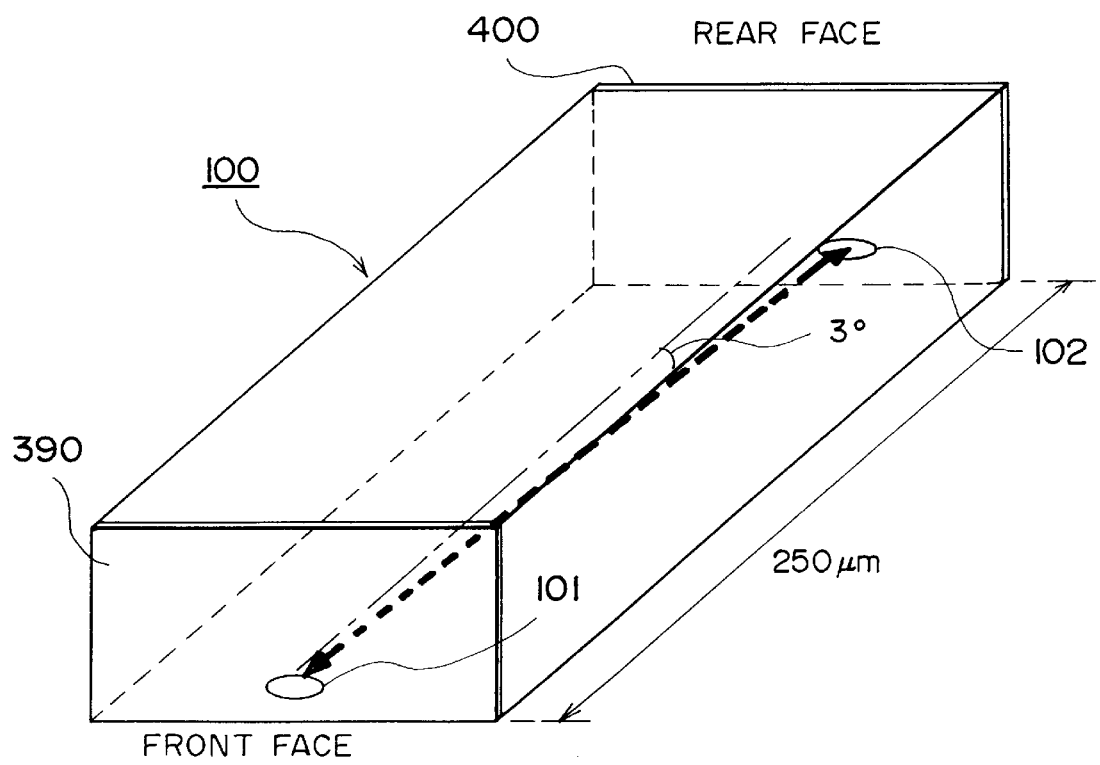
FIG. 2B is a perspective view showing the relationship between the direction of the resonator and the direction of the optical waveguide in the SLD in FIG. 2A.

In the following, the SLD which is an example of the semiconductor light amplifier device will be explained. FIG. 2A is a cross-sectional view showing a sectional configuration (in a transverse direction) perpendicular to the direction of the resonator of the SLD, whereas FIG. 2B is a perspective view of the SLD showing the relationship between the direction of the resonator and the direction of the optical waveguide.

As shown in FIG. 2A, the SLD comprises a first electrode 300, a cap layer 310 formed on the first electrode 300, a first clad layer 320 formed on the cap layer 310, an active layer 330 formed on the first clad layer 320, a second clad layer 340 formed like a stripe ridge on the active layer 330, a current block layer 350 formed on side faces and bottom face of the stripe ridge of the second clad layer 340, a buffer layer 360 formed on the upper face of the stripe ridge of the second clad layer 340 and on the current block layer 350, a substrate 370 disposed on the buffer layer 360, and a second electrode 380 formed on the substrate 370.

Here, a preferable example of material compositions for the SLD 100 is explained in the following. The active layer 330 is made of p-GaAs containing a predetermined p-type dopant. The first clad layer 320 is made of $p\text{-Ga}_{1-x}\text{Al}_x\text{As}$ containing a predetermined p-type dopant. The second clad layer 340 is made of $p\text{-Ga}_{1-x}\text{Al}_y\text{As}$ containing a predetermined n-type dopant. The substrate 370, the buffer layer 360 and the cap layer 310 are made of GaAs.

Thus, a double hetero-structure in which the active layer 330 is held between the first and second clad layers 320 and 340 which come into contact therewith respectively from the upper and lower portions thereof and each of which has a forbidden band width greater than the forbidden band width of the active layer 330. Namely, the refractive index distribution in the SLD is such that the refractive index is much higher in the active layer 330 than in the first and second clad layers 320 and 340.

Also, there is formed a gain waveguide stripe structure in which both sides of the stripe ridge of the second clad layer 340 are buried under the current block layer 350. Namely, the carrier density distribution in the SLD is such that the carrier density distribution is much higher in the stripe ridge (center portion of the device) than in the periphery of the stripe ridge.

As shown in FIG. 2B, the resonator length of the SLD is 250 μm, for example, and one end face (front face) thereof is coated with a reflection-free film 390 so as to form the exit end 101, whereas the other end face (rear face) is coated with a reflecting film 400 to form the exit end 102. Also, the direction of the optical waveguide indicated by a broad broken line in this drawing is tilted, for example, by an angle of about 3° with respect to the direction of the resonator indicated by an alternate dash and short dash line, thereby forming a so-called slant optical waveguide structure. Here, the reflecting film 400 has a reflectance of about 50% with respect to the outgoing light of the SLD.

Thus, the SLD is basically a light-emitting device which has a configuration substantially the same as that of a semiconductor laser. The SLD differs from the semiconductor laser, however, in that the exit end 101 on the front side is coated with the reflectionfree film 390 so as to eliminate the reflection of light at the exit end 101, thereby realizing a configuration in which there is no reflected light from the exit end 101 fed back to the optical waveguide and thus suppressing the laser oscillation caused by resonance.

Also, the SLD, which is generally a light-emitting device having a gain waveguide type stripe structure or narrow stripe structure, has a large resonator loss before reaching an oscillation state and a low Q value (=frequency×[energy accumulated within the resonator]/[energy consumed per unit time]). Accordingly, as the threshold current density is higher, the induced emission light (superluminescence) becomes stronger, thereby equivalently increasing the contribution of the spontaneous emission light so as to yield a multi-mode oscillation.

Figure 3:
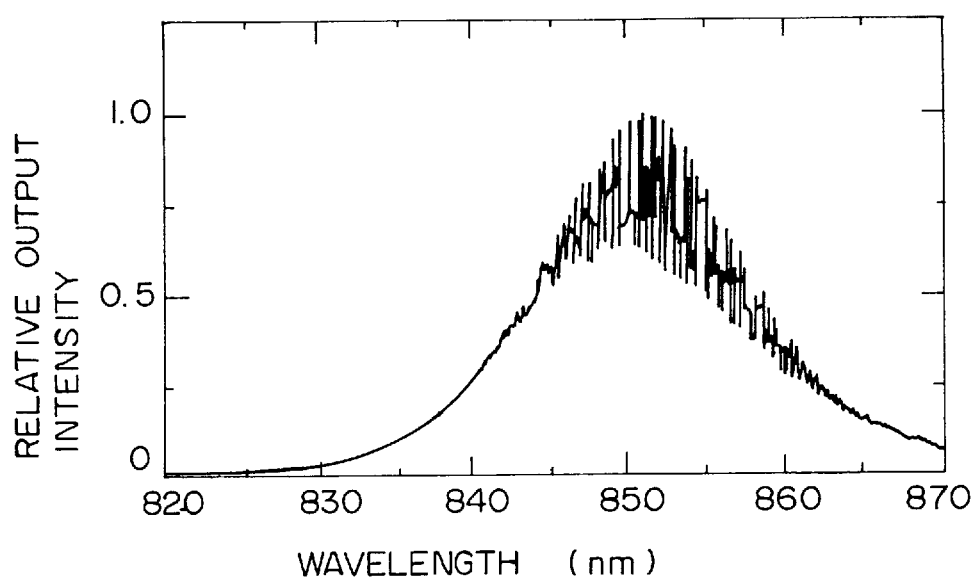
FIG. 3 is a graph showing, as a light emission spectrum in the SLD of FIGS. 2A and 2B, the relationship between wavelength and relative output intensity.

FIG. 3 is a graph showing an emission spectrum of such an SLD. Here, the horizontal axis sets the wavelength of the outgoing light of the SLD, while the vertical axis sets the relative optical intensity of the outgoing light of the SLD with its maximum output standardized as 1. As shown in this graph, an output of a continuous spectrum by spontaneous emission light 490. without a clear oscillation mode is obtained. In general, the half width of the oscillation spectrum is about 20 nm with respect to the oscillation center wavelength of the SLD at 850 nm. Also, the coherence length is as short as about 35 μm. Thus, the SLD has a characteristic clearly different from that of the semiconductor laser.

Figure 4A:
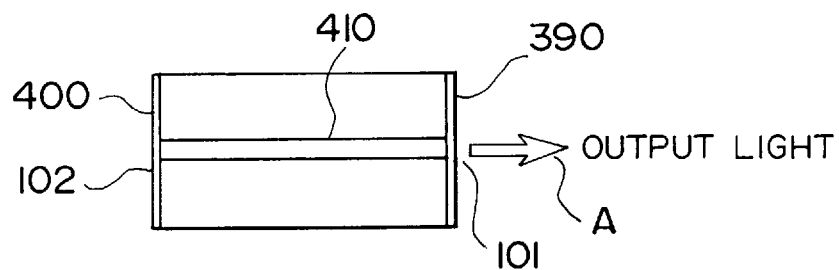
FIG. 4A is a cross-sectional view of the SLD of FIGS. 2A and 2B, in parallel to the direction of the resonator, showing a configuration in which a reflection-free film is coated on the exit end in order to reduce the reflectance on the light-emitting side.
Figure 4B:
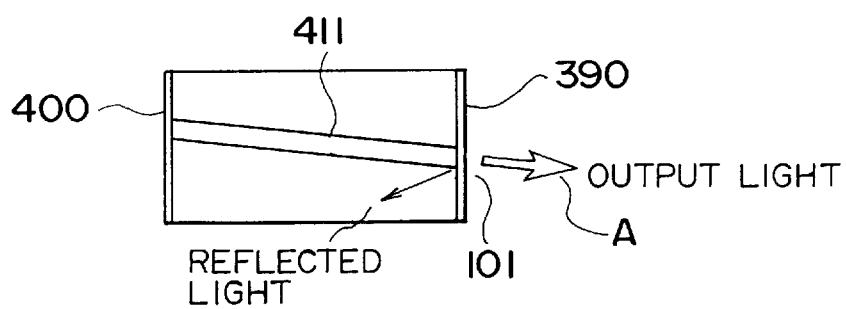
FIG. 4B is a cross-sectional view of the SLD of FIGS. 2A and 2B, in parallel to the direction of the resonator, showing a slant optical waveguide structure for reducing the reflectance on the light-emitting side.
Figure 4C:
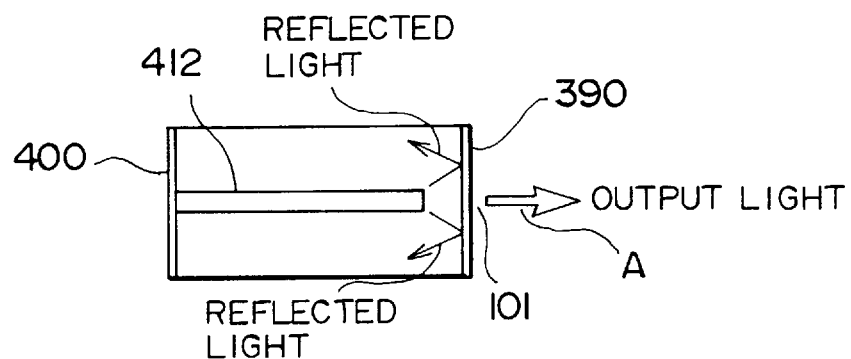
FIG. 4C is a cross-sectional view of the SLD of FIGS. 2A and 2B, in parallel to the direction of the resonator, showing a cut-off optical waveguide structure for reducing the reflectance on the light-emitting side.

Here, FIGS. 4A to 4C respectively show methods for reducing the reflectance on the light-emitting side of the SLD. With reference to these drawings, the configurations for reducing the reflectance on the light-emitting side of the SLD will be explained as follows.

In the SLD shown in FIG. 4A, the direction of an optical waveguide 410 coincides with the direction of the resonator as in the case of the semiconductor laser. While the light exit end face 102 on the rear side is coated with the reflecting film 400 having a reflectance of about 50%, the light exit end face 101 on the front side is coated with the reflection-free film 390 which is accurately controlled, whereby the reflectance on the light-emitting side can be reduced.

In the SLD shown in FIG. 4B, as explained above in detail with reference to FIG. 2B, while the light exit end face 101 on the front side and the light exit end face 102 on the rear side are respectively coated with the reflection-free film 390 and the reflecting film 400 as in the case of FIG. 4A, adopted is a slant optical waveguide structure in which an optical waveguide 411 is tilted by an angle of about 3° to 10° with respect to the direction of the resonator so as to prevent the reflected light from the light-emitting end face 101 from being fed back to the optical waveguide 411, whereby the reflectance on the light-emitting side can be reduced.

In the SLD shown in FIG. 4C, while the light exit end face 101 on the front side and the light exit end face 102 on the rear side are respectively coated with the reflection-free film 390 and the reflecting film 400 as in the case of FIG. 4A, adopted is a cut-off waveguide structure in which an optical waveguide 412 is cut off in the middle so as not to reach the light-emitting end face 101, thereby preventing the reflected light from the light-emitting end face from being fed back to the optical waveguide 412, whereby the reflectance on the light-emitting side can be reduced.

Figure 5:
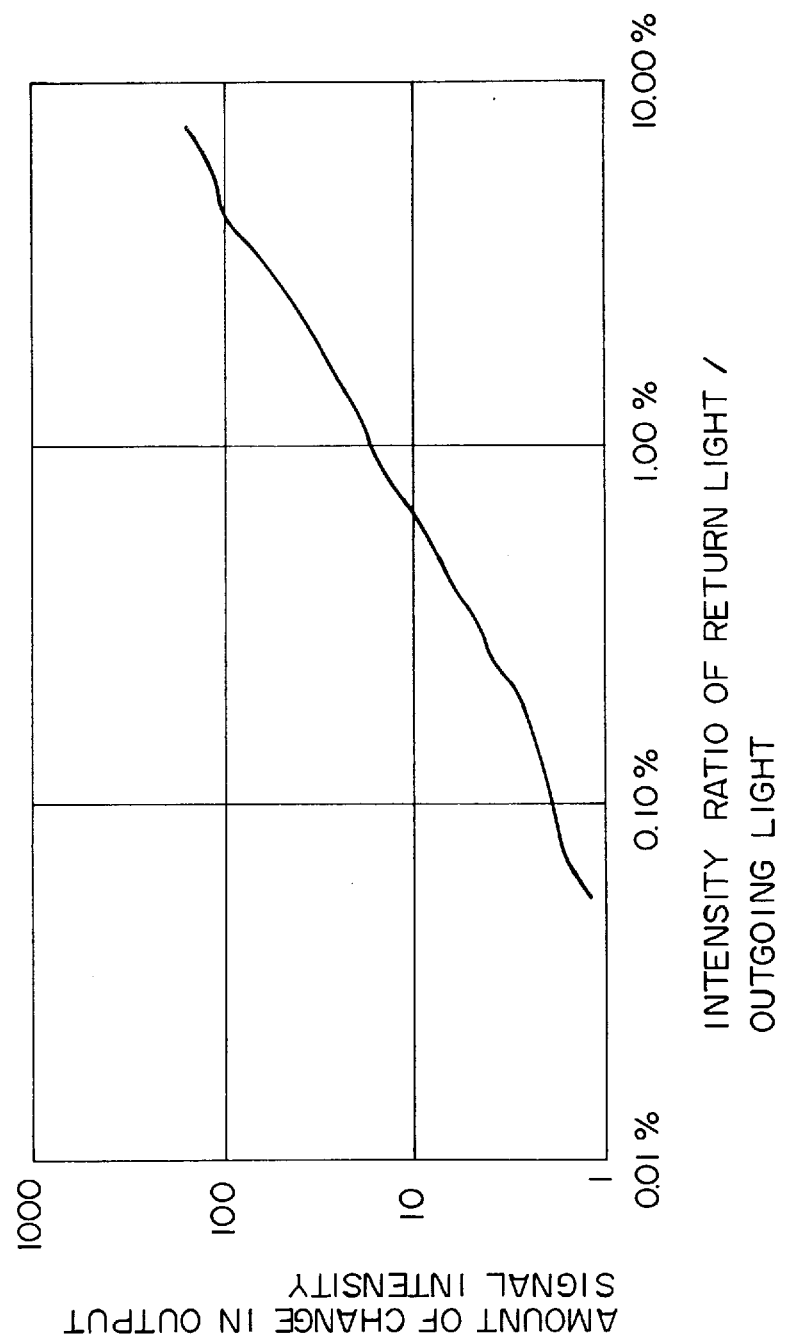
FIG. 5 is a graph showing, as a result of an experiment, the relationship between the intensity of return light incident on the SLD of FIGS. 2A and 2B in a feedback manner and the intensity of the outgoing light emitted from the SLD.

In the following, the relationship between the intensity of the return light incident on the SLD 100 and the intensity of the outgoing light emitted from the SLD 100 will be explained. FIG. 5 is a graph showing a result of an experiment concerning the relationship between the intensity of the return light and the change in intensity of the outgoing light. In this graph, the horizontal axis indicates the ratio of intensity of the return light to that of the outgoing light, whereas the vertical axis indicates the amount of change in the voltage signal output from the amplifier 150, i.e., amount of change in intensity of the outgoing light from the SLD 100.

As can be seen from this graph, as the light quantity of the return light incident on the light-emitting end of the SLD 100 is higher, due to the light-amplifying function thereof, the light quantity of the outgoing light increases. Accordingly, it is seen that the SLD 100 can be used in a laser feedback optical detection technique. Also, in a region where the light quantity of the return light is relatively small, the change in the light quantity of the outgoing light with respect to the light quantity of the return light has a good linearity.

Also, a very small quantity of return light having a ratio of about 0.05% with respect to the light quantity of the outgoing light can be detected with a high sensitivity. This sensitivity of the SLD 100 for detecting the return light is higher than that of the semiconductor laser by about 100 times. This is due to the fact that, since the outgoing light from the SLD 100 has a large amount of spontaneously emitted light components and since it effects a multi-mode oscillation, the noise generated by the return light becomes very small in case that the SLD 100 is used in the laser feedback optical detection technique. Here, the optical feedback gain (=[amount of change in outgoing light] / [amount of change in return light]) is similar to that in the case of the semiconductor laser.

As explained in the foregoing, when an SLD is used in the photodetector apparatus utilizing the laser feedback optical detection technique shown in FIG. 1, though there may be a slight difference among types of the SLD, highly sensitive measurement with less noise can be effected.

Second Embodiment

Figure 6:
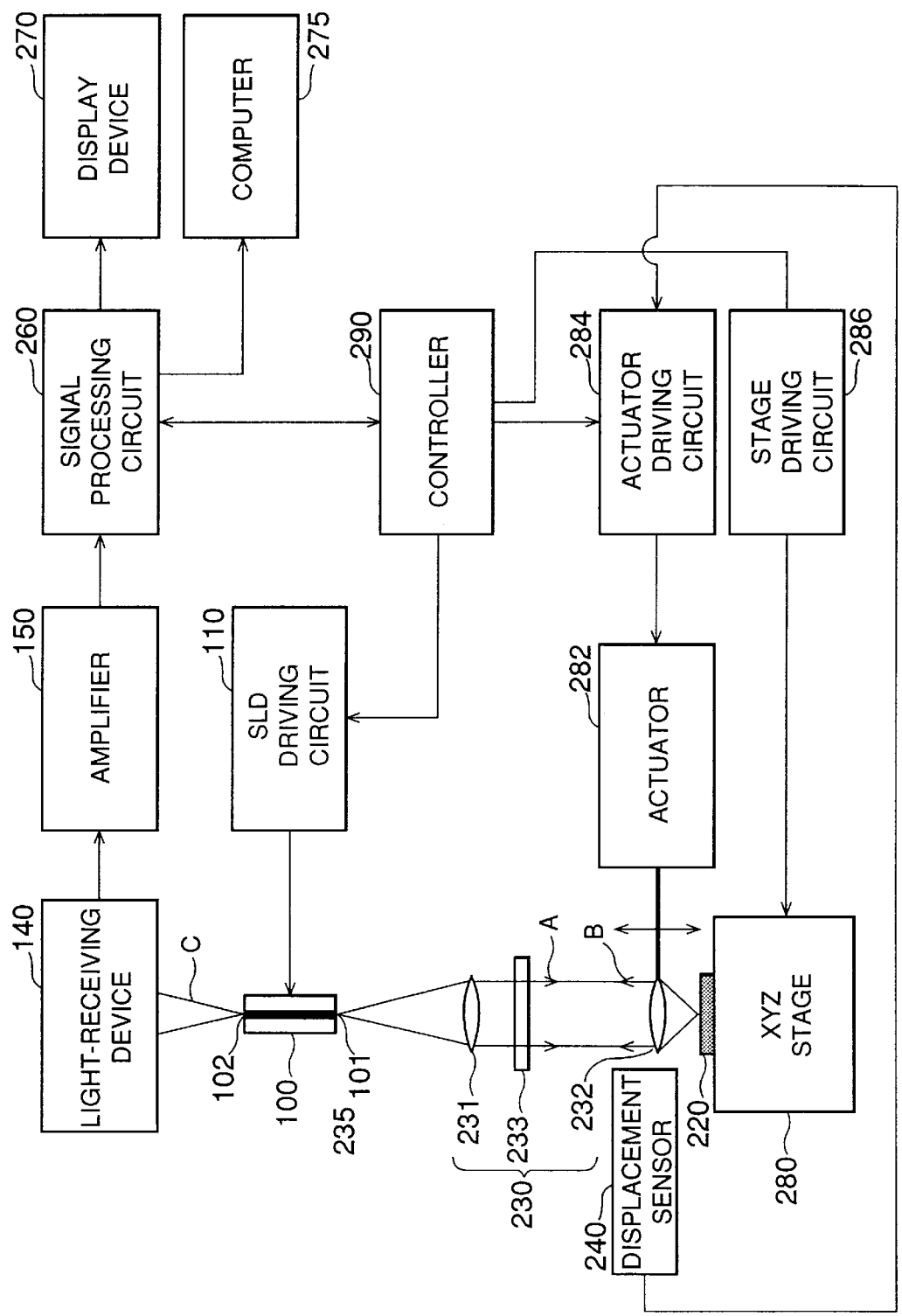
FIG. 6 is a block diagram showing the configuration of the second embodiment of the photodetector apparatus in accordance with the present invention.

In the following, the second embodiment concerning the photodetector apparatus of the present invention will be explained. FIG. 6 is a block diagram showing the configuration of this embodiment. This embodiment is a photodetector apparatus which is suitably utilized in a confocal microscope, for example.

As shown in FIG. 6, this photodetector apparatus comprises (1) the superluminescent diode 100 having the exit end 101 processed to yield no reflection; (2) the SLD driving circuit 110 which supplies a driving signal to the SLD 100 so as to drive the latter; and (3) an optical system 230 which converges the forward outgoing light A emitted from one exit end 101 and irradiates therewith an object 220 to be measured, while converging the reflected light, scattered light, or diffracted light from the object 220 so as to make it incident on the exit end 101 of the SLD 100 in a feedback manner.

This photodetector apparatus further comprises (4) the light-receiving device 140 which receives the backward outgoing light C emitted from the other exit end 102 of the SLD 100; (5) the amplifier 150 which converts a current signal output from the light-receiving device 140 into a voltage signal and amplifies this voltage signal; (6) a signal processing circuit 260 which effects a predetermined signal processing on the basis of the voltage signal output from the amplifier 150; and (7) a display device 270 which displays results of the signal processing in the signal processing circuit 260.

Further, this photodetector apparatus comprises (8) an XYZ stage 280 which adjusts or moves a position of the object 220; (9) an actuator 282 which moves or moves an objective lens 232 in the direction of its optical axis; (10)) a stage driving circuit 286 which drives and controls the XYZ stage 280; (11) an actuator driving circuit 284 which drives and controls the actuator 282; and (11) a controller 290 which controls operations of the SLD driving circuit 110, the stage driving circuit 286, and the actuator driving circuit 284, and transmits the positional information of the object 220 to the signal processing circuit 260.

Here, the SLD 100 is a semiconductor light amplifier of gain waveguide type having a light-amplifying function caused by the light incident on the exit end 101 from the outside. Also, the optical system 230 is constituted by a collimator lens 231, the objective lens 232, and a polarizing filter 233, and infinitely corrects the bundle of rays between these two lenses, while selectively extracting a particular polarization component from this bundle of rays.

In this photodetector apparatus, the forward outgoing light A emitted from the exit end 101 of the SLD 100 in response to the driving signal, i.e., constant injected current, output from the SLD driving circuit 110 is turned into a parallel bundle of rays by the collimator lens 231. Then, only a predetermined polarization component thereof is transmitted through the polarizing filter 233 and converged by the objective lens 232 so as to irradiate a predetermined position of the object 220. The light reflected, scattered, or diffracted by the object 220 is converged by the objective lens 232 and, by way of the polarizing filter 233 and the collimator lens 231, is made incident on the exit end 101 of the SLD 100 as the return light B.

When the return light B is incident on the SLD 100, the intensity of the forward outgoing light A emitted from the exit end 101 of the SLD 100 changes according to the light-amplifying function of the SLD 100. Also, the light quantity of the backward outgoing light C, which is output from the exit end 102 of the SLD 100 opposite to the exit end 101, is in proportion to the light quantity of the forward outgoing light A. The backward outgoing light C is received by the light-receiving device 140 and converted into a current signal corresponding to the intensity thereof. In the amplifier 150, the current signal output from the light-receiving device 140 is converted into a voltage signal and amplified so as to be output therefrom.

Here, in the optical system 230, the forward outgoing light A emitted from the light-emitting end 101 of the SLD 100 is converged onto and irradiates a predetermined position of the object 220 (focal position of the objective lens 232), while only the reflected light, scattered light, and diffracted light generated at this predetermined position are incident on the exit end 101 of the SLD 100 in a feedback manner. Namely, a confocal microscope is realized, whereby, based on relative positional information of the objective lens 232 and the object 220 with respect to each other and the voltage signal output from the amplifier 150, an optical characteristic of the object 220 at the position irradiated with the converged forward outgoing light A is obtained.

Accordingly, when at least one of the optical system 230 and the object 220 is moved or scanned, an optical characteristic distribution of the object 220 is obtained. Therefore, as scanning means for this purpose, provided are the actuator 282 for moving the objective lens 232 in Z direction and the XYZ stage 280 for moving or scanning the object 220 in X, Y, and Z directions.

The controller instructs the actuator driving circuit 284 to vibrate the objective lens 232 by way of the actuator 282, while transmitting the positional information of the objective lens 232 to the signal processing circuit 260. The actuator 282 uses a piezoelectric device, for example. On the basis of the positional information of the objective lens 232 transmitted from the controller 290 and the voltage signal transmitted from the amplifier 150, the signal processing circuit 260 determines an optical characteristic distribution in the thickness direction of the object 220.

The display device 270 displays, as an image, thus determined optical characteristic distribution in the thickness direction of the object 220. Here, as a computer 275 performs various kinds of operational processing on the basis of the distribution data in the thickness direction of the object 220 input from the signal processing circuit 260, a processing necessary for forming three-dimensional image data of the object 220, for example, can be effected.

Further, in the case where a displacement sensor 240 for measuring the displacement of the objective lens 232 is provided, as an error signal concerning the displacement of the objective lens 232 with respect to the waveform of the driving signal supplied to the actuator 282 from the actuator driving circuit 284, a detection signal by which the position of the objective lens 232 has been measured may be fed back to the actuator driving circuit 284, whereby the error in displacement of the objective lens 232 can be compensated for. Preferably, the displacement sensor 240 is a laser interferometer, for example.

The controller 290 instructs the stage driving circuit 286 to adjust the position of the object 220 by way of the XYZ stage 280. The XYZ stage roughly adjusts the position of the object in Z direction so as to define a range of measurement of the object 220 which is to be measured according to the scanning in Z direction effected by the actuator 282. Also, the XYZ stage 280 moves the object 220 in at least one of X and Y directions so as to define the range of measurement of the object 220, while scanning the object 220 so as to determine an optical characteristic distribution in X or Y direction.

Further, in the case where the relative positional relationship between the objective lens 232 and the object 220 is sequentially set such that the object 220 is two-dimensionally scanned, a two-dimensional distribution of an optical characteristic (tomographic image) of the object 220 can be obtained. Here, it is necessary for the optical distance between the exit end 101 of the SLD 100 and the object 220 to be sufficiently longer than the coherence length of the outgoing light A emitted from the SLD 100. The purpose of this feature is to eliminate the influence of interference effected by the return light B incident on the SLD 100.

Figure 7:
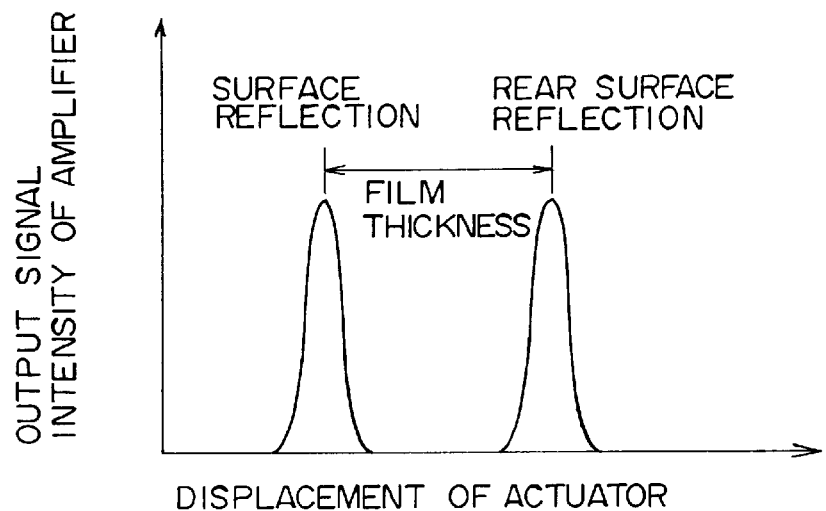
FIG. 7 is a graph showing, as a result of thickness measurement of the object to be measured by means of the photodetector apparatus of FIG. 6, the relationship between the displacement of the actuator and the voltage output signal intensity of the amplifier.

In the following, explanation will be provided for an example in which the photodetector apparatus in accordance with this embodiment is used for measuring the thickness of a transparent body (object 220) as structural information thereof. FIG. 7 is a graph showing the result of thickness measurement of the object to be measured by means of the photodetector apparatus in accordance with this embodiment. In this graph, the horizontal axis indicates the displacement of the actuator 282, i.e., displacement of the objective lens 232 along the optical axis direction of the optical system 230, whereas the vertical axis indicates the intensity of the voltage signal output from the amplifier 150.

As can be seen from this graph, the intensity of the output signal from the amplifier 150 has peaks at two positions with respect to the displacement of the actuator 282. One of these two peaks corresponds to the case where the forward outgoing light A is reflected by the surface of the object 220, and thus reflected light is incident on the SLD 100 in a feedback manner as the return light B; whereas the other peak corresponds to the case where the forward outgoing light A is reflected by the rear surface of the object 220, and thus reflected light is incident on the SLD 100 in a feedback manner as the return light B. Accordingly, from the distance between these two peaks, i.e., difference in displacement of the actuator 282, the thickness of the object 220 can be determined.

In the following, measurement of a tomographic image of an object to be measured by means of the photodetector apparatus in accordance with this embodiment will be explained. In order to obtain a tomographic image of the object 220, for example, the objective lens 232 is moved in the optical axis direction (Z direction) of the optical system 230 by the actuator driving circuit 284 by way of the actuator 282, while the object 220 is scanned in X direction by the stage driving circuit 286 by way of the XYZ stage 280.

Thus, the focal position of the objective lens 232 in the object 220 is two-dimensionally scanned in X and Z directions. The tomographic image of the object 220 is determined by the signal processing circuit 260 on the basis of the displacement of the objective lens 232 in Z direction, the displacement of the XYZ stage 280 in X direction, and the voltage signal output from the amplifier 150, and then is displayed on the display device 270.

Figure 8:
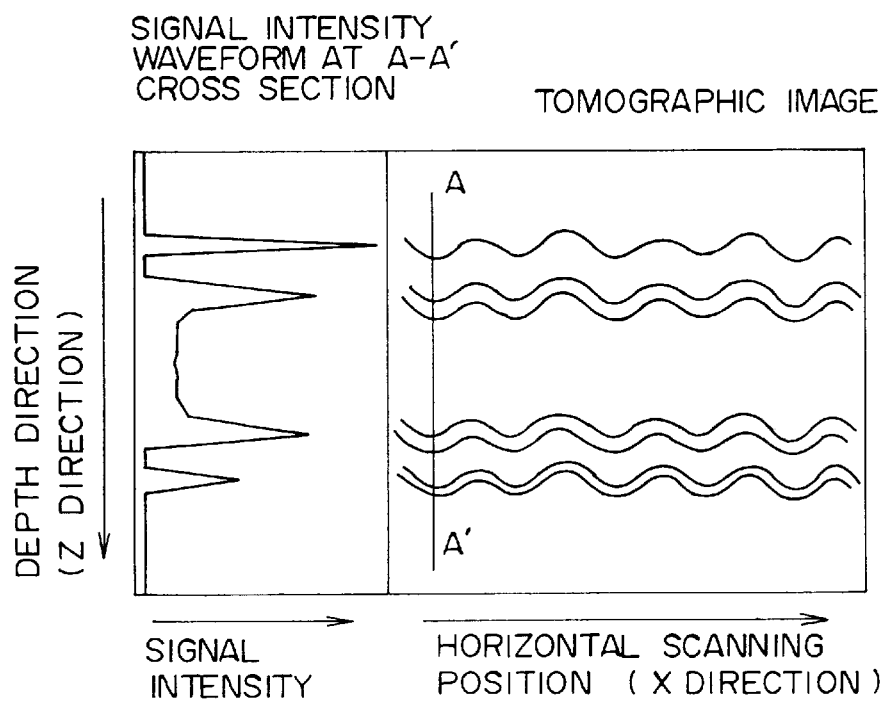
FIG. 8 is a graph showing, as a result of measurement of a tomographic image of the object to be measured by means of the photodetector apparatus of FIG. 6, an example of the tomographic image displayed on a display device.

FIG. 8 is a view showing an example of an tomographic image displayed on the display device 270 after the tomographic image of the object was measured by use of the photodetector apparatus in accordance with this embodiment. In FIG. 8, the right-side region represents the tomographic image, in which the lateral direction corresponds to the displacement of the XYZ stage 280 in X direction, whereas the vertical direction corresponds to the displacement of the objective lens 232 in Z direction. Also, the image is displayed with a variable density in response to the intensity of the backward outgoing light C of the SLD 100 at each position, i.e., the intensity of the voltage signal from the amplifier 150. Namely, a tomographic image obtained when the object 220 is two-dimensionally scanned in X and Y directions is shown.

Also, the left-side region of FIG. 8 shows the waveform of intensity of the voltage signal from the amplifier 150 on line A–A' in the tomographic image. Here, when the position of A–A' line in the tomographic image can be designated, a user can obtain the signal intensity at any position in the tomographic image as well as a signal intensity waveform on any line in the tomographic image, thereby enabling quantitative analysis.

The display on the display device 270 is not restricted to the above-mentioned view. For example, the tomographic image obtained as the XYZ stage 280 is scanned in X direction may be displayed in the right-side region on the screen while being moved in the rightward direction, whereas the latest signal intensity in Z direction may be displayed in the left-side region on the screen. In this manner, even when the area of measurement is not within the display screen of the display device 270, the object 220 can be continuously measured, and its results can be displayed.

In the following, the operation and effect of the polarizing filter 233 will be explained in detail. As previously mentioned, the photodetector apparatus in accordance with this embodiment is equivalent to a confocal microscope. In such a confocal optical system, though dependent on the numerical aperture NA of the objective lens 232, the focal depth in the object 220 is quite small. Accordingly, measurement can be effected with an excellent positional resolution in the depth direction of the object 220.

Here, it has been known that, since the SLD 100 has a gain waveguide type stripe structure, the outgoing light thereof includes a vertical transverse mode light component (polarized light in a direction perpendicular to the active layer) and horizontal transverse mode light component (polarized light in a direction in parallel to the active layer), and that a large astigmatic difference exists between the vertical transverse mode light component and the horizontal transverse mode light component. Namely, while the beam waist position of the vertical transverse mode light component is at the end face position of the exit end 101 of the SLD 100, the beam waist position of the horizontal transverse mode light component is placed at a position inside of the end face position of the exit end 101 of the SLD 100 by a predetermined distance (astigmatic difference).

Due to this astigmatic difference, the confocal optical system with the SLD 100 as its light source has focal positions different from each other respectively with respect to the vertical transverse mode light component and the horizontal transverse mode light component. Consequently, the positional resolution in the depth direction of the object to be measured deteriorates.

Figure 9:
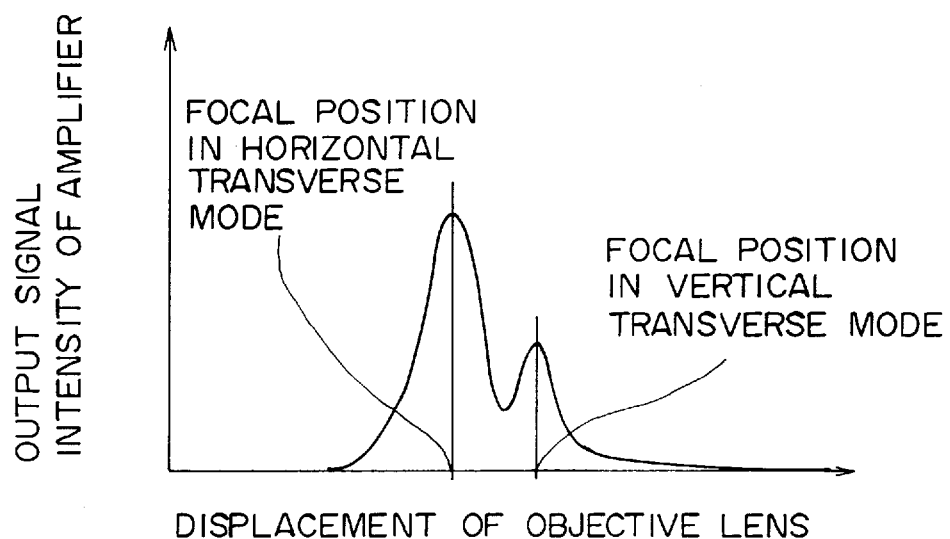
FIG. 9 is a graph showing, as a result of thickness measurement of the object to be measured in the case where a polarizing filter is removed from the optical system in the photodetector apparatus of FIG. 6, the relationship between the displacement of the actuator and the voltage output signal intensity of the amplifier.

In the photodetector apparatus in accordance with this embodiment shown in FIG. 6, for example, when, without the polarizing filter 233, the objective lens 232 is moved in the optical axis direction of the optical system 230 by the actuator 282 such that the focal position of the objective lens 232 changes around the surface of the object 220, and the change in intensity of the voltage signal output from the amplifier 150 is measured, results such as those shown in FIG. 9 are obtained. In this chart, the horizontal axis indicates the displacement of the objective lens 232, whereas the vertical axis indicates the amount of change in intensity of the voltage signal output from the amplifier 150.

As shown in this chart, two peaks are seen in the signal intensity. The main peak corresponds to the case concerning the horizontal transverse mode light component where the focal point of the objective lens 232 is located on the surface of the object 220. The sub-peak corresponds to the case concerning the vertical transverse mode light component where the focal point of the objective lens 232 is located on the surface of the object 220.

In view of such circumstances, the polarizing filter 233 is provided in order to overcome the problem that the positional resolution in the depth direction deteriorates due to the astigmatic difference. Namely, of the outgoing light A emitted from the SLD 100, only the horizontal transverse mode light component, which is of a fundamental transverse mode, is transmitted through the polarizing filter 233 so as to irradiate the object 220; whereas, of the return light B from the object 220, only the fundamental transverse mode light component is transmitted through the polarizing filter 233 so as to enter the exit end 101 of the SLD 100. Here, the polarizing filter is preferably a Nicol prism made of a birefringent crystal, for example.

Figure 10:
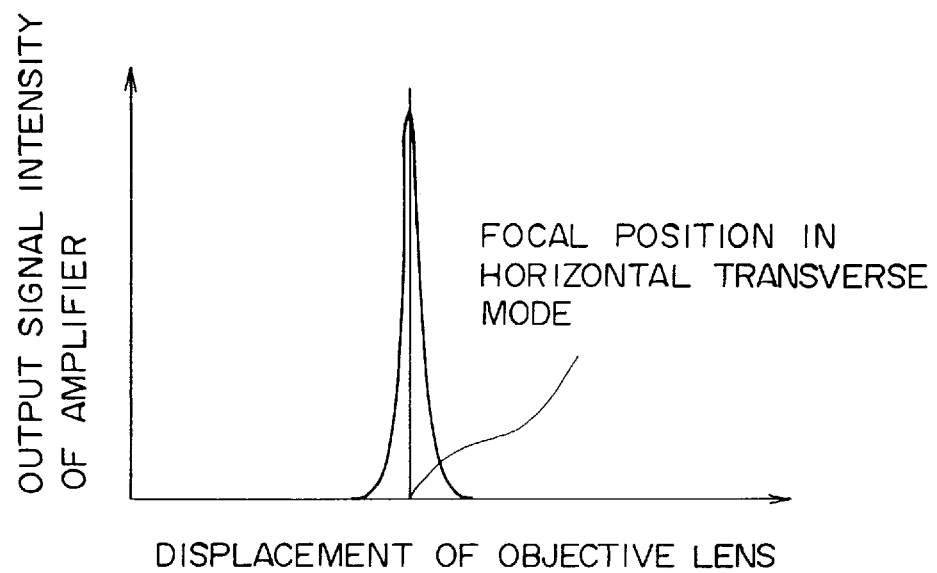
FIG. 10 is a graph showing, as a result of thickness measurement of the object to be measured in the case where a polarizing filter is disposed in the optical system in the photodetector apparatus of FIG. 6, the relationship between the displacement of the actuator and the voltage output signal intensity of the amplifier.

In the photodetector apparatus in accordance with the present invention shown in FIG. 6, when, while the polarizing filter 233 whose optical axis is adjusted so as to transmit therethrough the horizontal transverse mode light component is in use, the objective lens 232 is moved in the optical axis direction of the optical system 230 by the actuator 282 such that the focal position of the objective lens 232 changes around the surface of the object 220, and the change in intensity of the voltage signal output from the amplifier 150 is measured, results such as those shown in FIG. 10 are obtained. Also in this chart, the horizontal axis indicates the displacement of the objective lens 232, whereas the vertical axis indicates the amount of change in intensity of the voltage signal output from the amplifier 150.

As indicated by FIG. 10, in the signal intensity, there can be seen only one peak corresponding to the case concerning the horizontal transverse mode light component where the focal point of the objective lens 232 is located on the surface of the object 220. Also, as compared with the signal intensity waveform shown in FIG. 9 in the case where the polarizing filter 233 is used in the photodetector apparatus, that shown in FIG. 10 has a narrower full width at half maximum (FWHM) while the peak intensity is higher. This phenomenon occurs due to the fact that, in the SLD 100 having a gain waveguide type stripe structure, oscillation is converged into the fundamental transverse mode by the return light B which has been selected by the polarizing filter 233 in terms of polarization.

Figure 11:
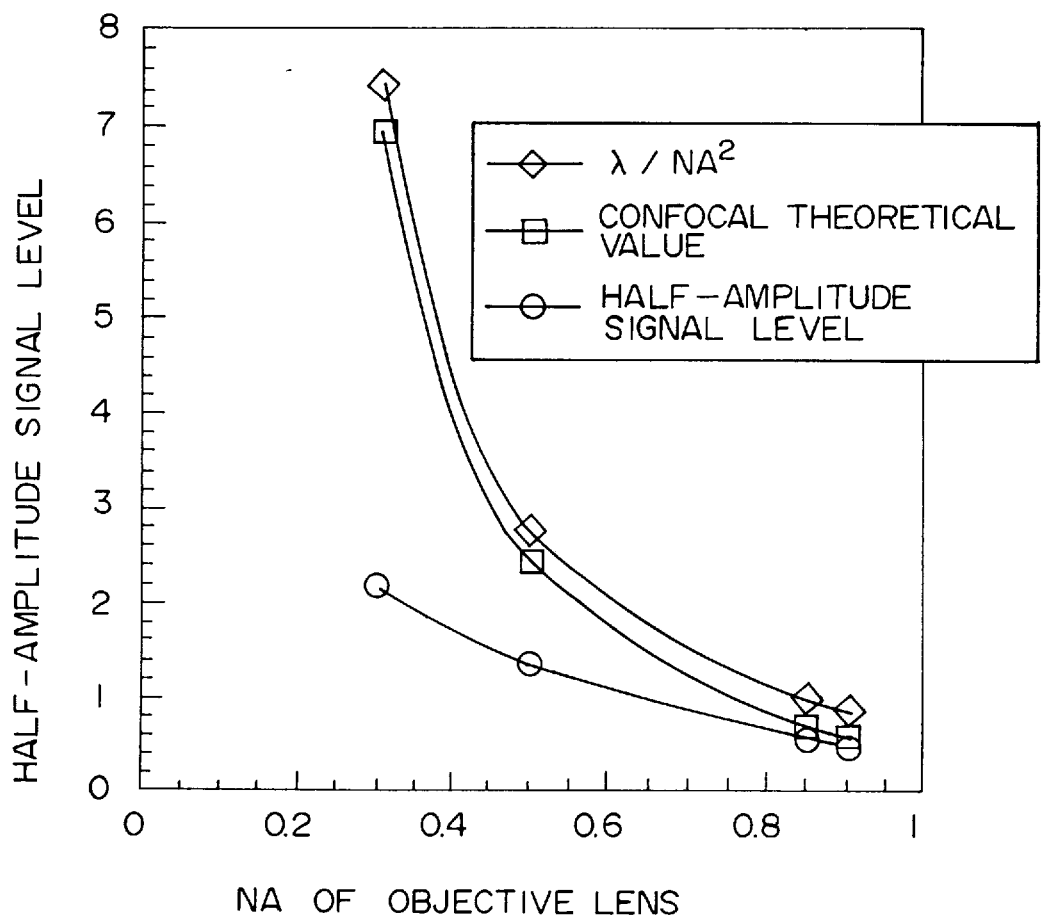
FIG. 11 is a graph showing the full width at half maximum of the signal intensity waveform of the amplifier in the photodetector apparatus of FIG. 6 and that of a theoretical objective lens based on the square law characteristic in a general confocal optical system in comparison with each other in terms of their changes with respect to the numerical aperture of the objective lens.

Also, as shown in FIG. 11, the full width at half maximum in the case where the polarizing filter 233 is used in the photodetector apparatus of this embodiment (indicated by circle signs in the chart) is smaller than the ratio $\lambda/NA^2$ (indicated by diamond signs in the chart) of the resolution $\lambda/NA$ in the objective lens with a numerical aperture NA for light having a wavelength $\lambda$ to the numerical aperture NA, and also smaller than the theoretical full length at half maximum (indicated by square signs in the chart) based on square law characteristics exhibited in a confocal optical system. Namely, in the photodetector apparatus in accordance with this embodiment, a positional resolution higher than that of the confocal microscopes is obtained. This is considered to be due to a spatial nonlinear property of the gain characteristics exhibited when the SLD 100 is operated in a feedback manner.

As explained in the foregoing, in the photodetector apparatus in accordance with this embodiment, not only the distortion in signal waveform caused by the astigmatic difference inherent in the SLD 100 can be eliminated but also the oscillation mode in the SLD 100 can be converged into the fundamental transverse mode so as to attain a very narrow full width at half maximum, whereby measurement can be effected with an excellent positional resolution in the depth direction of the object 220.

Also, of the reflected light and scattered light generated when the object 220 is irradiated with the is outgoing light A, the regularly reflected light component has a polarization state identical to that of the outgoing light A and thus passes through the polarizing filter 233 so as to enter the exit end 101 of the SLD 100. By contrast, the direction of polarization of the scattered light component is in disorder, and its polarizing component perpendicular to the direction of polarization of the outgoing light A is blocked by the polarizing filter 233. Accordingly, when the inner structure of the object 220 with a large magnitude of scattering is to be measured, the influence of scattering can be alleviated, whereby its boundary surfaces can be measured with a high accuracy.

Examples of the polarizing filter 233 used for selecting the transverse mode include, in general, those utilizing a prism, those utilizing a polarizing film, and those utilizing a metal grating. Any of them can be used. Nevertheless, these polarizing filters may not always be used optimally since, when they are inserted into an optical path, light is somewhat lost when passing therethrough.

Figure 12A:
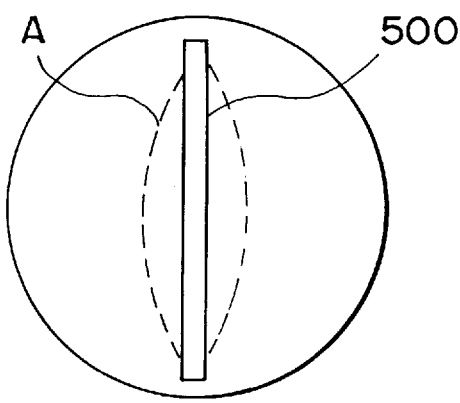
FIG. 12A is a plan view showing a configuration of a slit disposed in the optical system of the photodetector apparatus of FIG. 6 as polarization selecting system which substitutes for the polarizing filter.
Figure 12B:
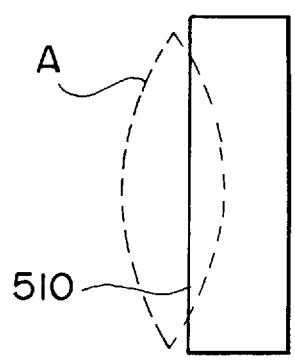
FIG. 12B is a plan view showing a configuration of a knife edge disposed in the optical system of the photodetector apparatus of FIG. 6 as polarization selecting system which substitutes for the polarizing filter.

Accordingly, as means for selecting the horizontal mode, a polarization selecting system using a slit or knife edge such as that shown in FIG. 12A or 12B is preferably used. In FIGS. 12A and 12B, an ellipse indicated by broken curve represents the beam shape of the forward outgoing light A emitted from the SLD 100 to arrive at the polarization selecting system.

When the longitudinal direction of a slit 500 shown in FIG. 12A coincides with a direction in parallel to the active layer 330 of the SLD 100, the horizontal transverse mode light component can be efficiently transmitted, while the vertical transverse mode light component is substantially blocked. Also, when the edge direction of a knife edge 510 shown in FIG. 12B coincides with a direction in parallel to the active layer 330 of the SLD 100, the horizontal transverse mode light component can be efficiently transmitted, while substantially the half of the vertical transverse mode light component is blocked.

In particular, the knife edge 510 is most preferable for minutely adjusting its position so as to minimize the influence of the transverse mode light component which is to be eliminated while optimizing the positional resolution in the depth direction. Also, since the intensity distribution of the outgoing light from the SLD 100 is symmetrical around the optical axis of the optical system 230, the aimed object can be sufficiently attained even when only the half of the transverse mode light component to be eliminated is eliminated.

More preferably, the polarization selecting system such as polarizing filter, slit, or knife edge is rotatable around the optical axis of the optical system. When it is made rotatable, the optic axis of the polarizing filter, the slit direction, the knife edge direction, or the like can be adjusted so as to coincide with the direction of polarization of the fundamental mode.

Though the horizontal transverse mode is adopted as the fundamental mode selected in terms of polarization by the polarization selecting system such as the polarizing filter in the foregoing explanation, the vertical transverse mode may be used as well. When a rotatable polarization selecting system is used, any of the horizontal transverse mode light component and the vertical transverse mode light component can be selected according to necessity. Also, without being restricted to positions between the collimator lens 231 and objective lens 232 as shown in FIG. 6, the polarization selecting system may be inserted at any position on the optical path between the SLD 100 and the object 220.

Without being restricted to the foregoing embodiments, the present invention can be modified in various manners. For example, the actuator 282 for moving the objective lens 232 shown in FIG. 6 is not restricted to that using a piezoelectric device, and a small tuning fork or a voice coil may be used to move the objective lens. The actuator using a piezoelectric device is preferable for moving a relatively heavy objective lens, whereas the actuator using a small tuning fork or voice coil is preferable for moving a relatively light objective lens.

Figure 13:
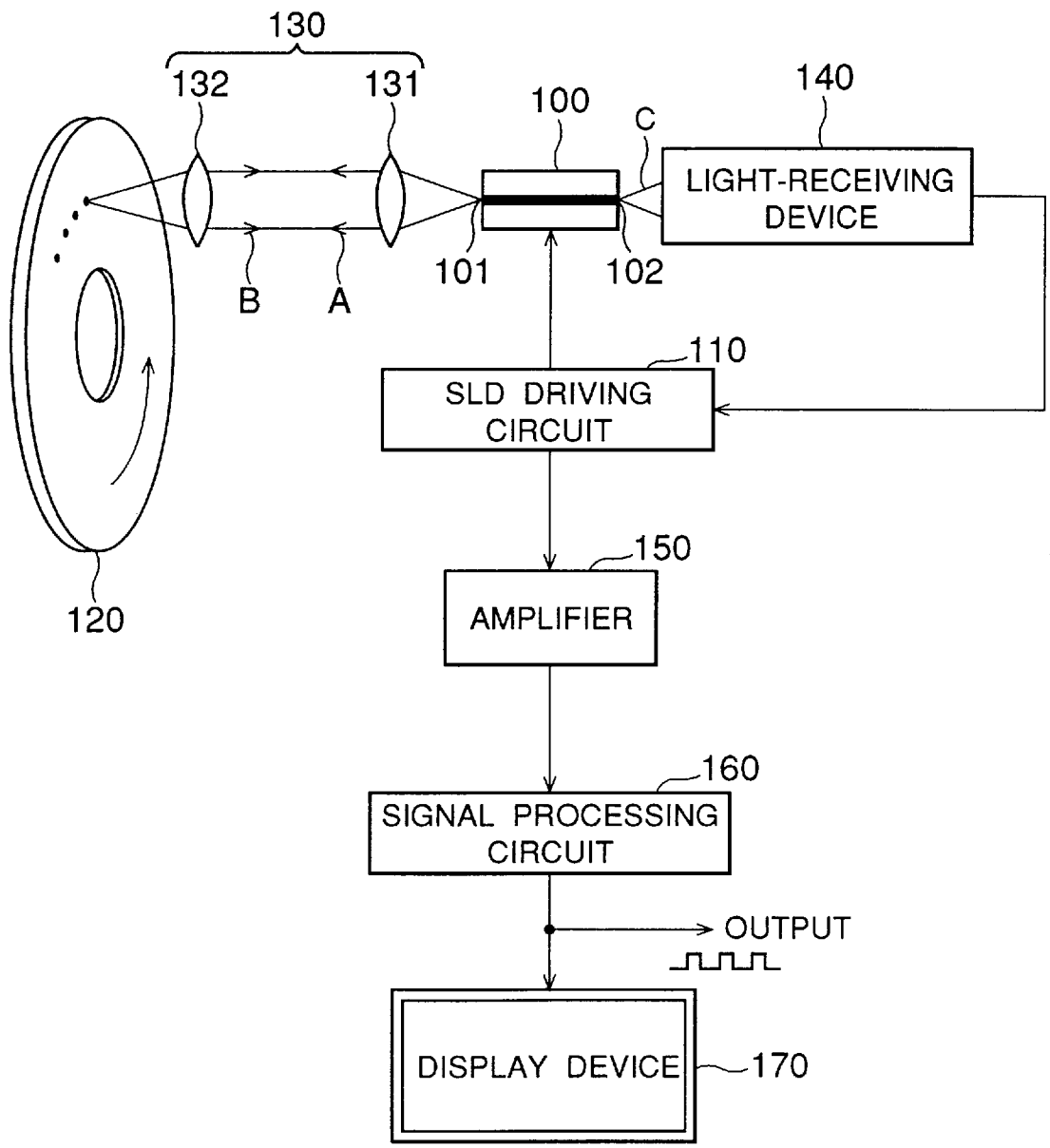
FIG. 13 is a block diagram showing the configuration of a modified example concerning the photodetector apparatus of FIG. 1.

Also, as shown in FIG. 13, the output from the light-receiving device 140 may be amplified and then fed back to the SLD driving circuit 110 so as to control the SLD 100 such that the light quantity of the outgoing light (forward outgoing light A or backward outgoing light C) from the SLD 100 becomes always constant, and the amount of change in the driving signal, i.e., injection current, supplied from the SLD driving circuit 110 to the SLD 100 may be detected, amplified by the amplifier 150, and then A/D-converted.

In this case, without being dependent on the reflectance of the object to be measured, the light quantity of the outgoing light from the SLD becomes constant. Accordingly, not only a wide dynamic range is attained in measurement but also, even when the reflectance of the object to be measured is large at the time of open loop operation, stable measurement can be effected without increasing the light quantity of the outgoing light from the SLD too much.

Figure 14:
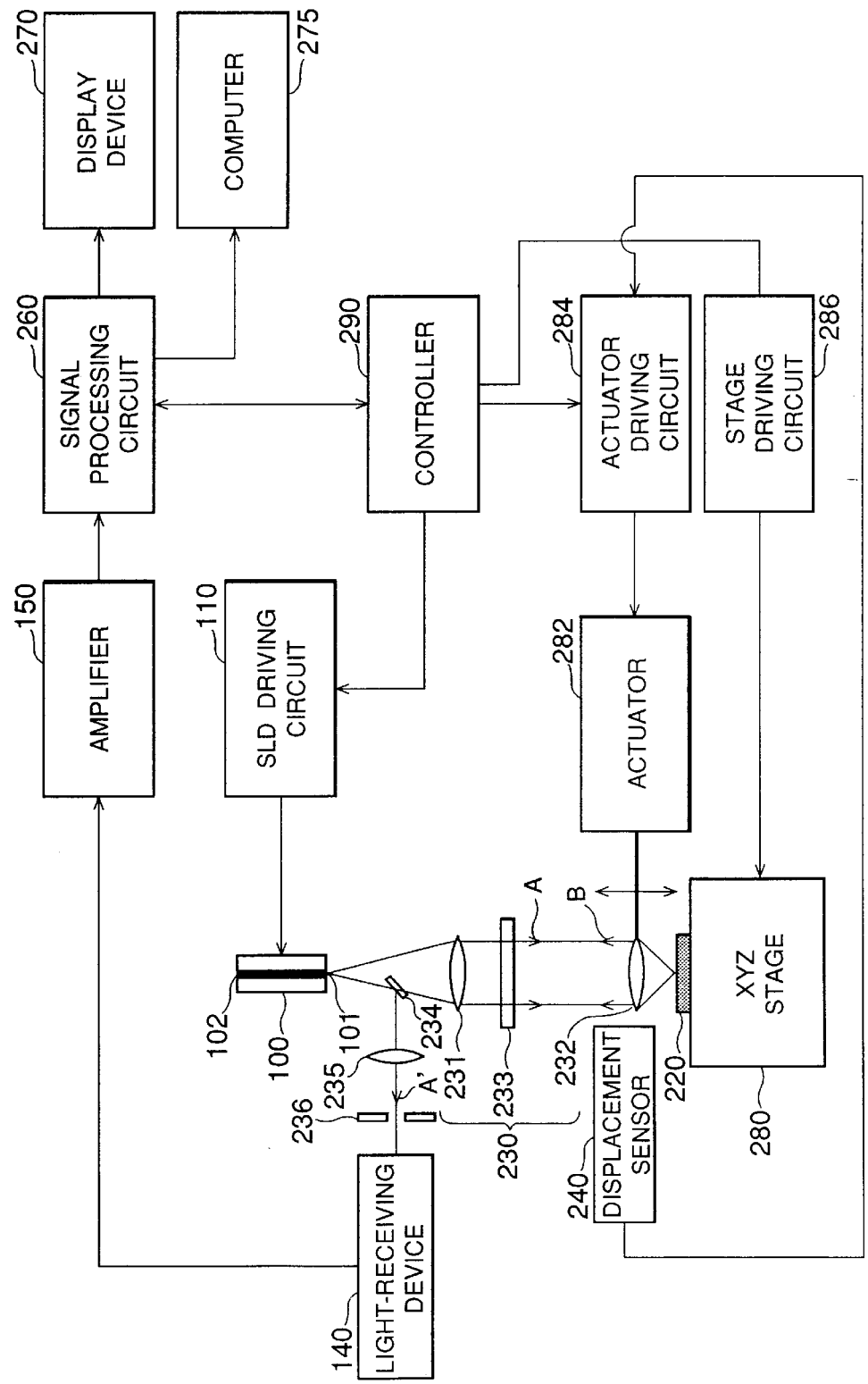
FIG. 14 is a block diagram showing the configuration of a modified example concerning the photodetector apparatus of FIG. 6.

Further, as shown in FIG. 14, the light-receiving device 140 may receive a part A' of the forward outgoing light from the SLD 100 instead of the backward outgoing light. In this case, the part A' of the forward outgoing light is branched off by a half mirror 234 disposed in the optical path between the SLD 100 and the object 220 and then converged by a condenser lens 235 onto a point of convergence, at which a pinhole 236 is disposed, and the light transmitted through the pinhole 236 is detected by the light-receiving device 140. A confocal optical system can be constituted by such a configuration as well.

As explained in detail in the foregoing, in accordance with the present invention, the semiconductor light amplifier device (SLD) receiving the driving signal output from the SLD driving circuit outputs the outgoing light from its exit end which has been processed to yield no reflection with a light quantity corresponding to the driving signal. This outgoing light irradiates, by way of the optical system, the object to be measured; whereas the reflected light, scattered light, and diffracted light generated by the object upon this irradiation trace back the optical system and are made incident on the exit end of the semiconductor light amplifier device as return light.

The light amplifier device performs optical amplification as the return light is incident thereon, thereby increasing the light quantity of the outgoing light. This change in light quantity of the outgoing light is output from the light-receiving device as a light-receiving signal. Thus, as the relationship between the driving signal and light quantity of the outgoing light in the semiconductor light amplifier device changes in response to the light quantity of the return light, the optical characteristic of the object is measured.

Thus configured photodetector apparatus has a quite simple configuration utilizing a laser feedback optical detection technique, while realizing a confocal optical system which is a basic configuration of the laser feedback optical detection technique. Accordingly, as irradiation of the object with light is optically adjusted, convergence of light is automatically adjusted as well. Also, measurement can be effected with a quite excellent resolution in the depth direction of the object.

Also, since a laser feedback optical detection technique is realized by use of a semiconductor light amplifier device (SLD), as compared with the laser feedback optical detection technique using a semiconductor laser, due to a spatial nonlinear property in gain characteristics, a high resolution exceeding the theoretical resolution based on square law characteristics inherent in the confocal optical system is obtained. Also, the conventional problem of noise caused by the return light can be overcome.

Accordingly, change in the light quantity of the outgoing light with respect to the light quantity of the return light attains an excellent linear property, while even the return light with a small quantity having a ratio of about 0.05% with respect to the outgoing light can be detected with a favorable sensitivity, whereby a high S/N ratio and a wide dynamic range are achieved.

Further, when a polarization selecting system such as a polarization filter which selectively transmits therethrough a predetermined polarization component of each of the outgoing light and return light is provided in the optical system so as to select one of transverse modes of the outgoing light from the semiconductor light amplifier device (SLD), the problem of astigmatic difference inherent in the semiconductor light amplifier device is overcome, whereby measurement can be effected with a high resolution exceeding the theoretical resolution based on square law characteristics inherent in the confocal optical system.

Also, since it is unnecessary to use a detector means such as lock-in amplifier, high speed response can be effected, while the apparatus can be made smaller and inexpensive, whereby it is suitably applied to pickup technique for optical disks as well as confocal microscopes.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 41802/1996 filed on Feb. 28, 1996 is hereby incorporated by reference.

What is claimed is:

1. A photodetector apparatus comprising:

first driving circuit which outputs a first driving signal;

a semiconductor light amplifier device which emits, from a first exit end arranged to yield no reflection, a first light beam having a light quantity corresponding to said first driving signal input from said first driving circuit, and optically amplifies said first light beam based on a second light beam which is incident on said first exit end in a feedback manner so as to return light from an object to be measured which is irradiated with said first light beam, wherein said first driving circuit supplies a constant injection current to said semiconductor light amplifier device as said first driving signal;

an optical system which irradiates said object with said first light beam incident thereon from said semiconductor light amplifier device, and makes said second light beam, which is incident thereon from said object, incident on said semiconductor light amplifier device in a feedback manner;

a light receiving device which detects a third light beam emitted from said semiconductor light amplifier device with a light quantity in proportion to the light quantity of said first light beam, and outputs a light-receiving signal corresponding to the light quantity of said third light beam;

an amplifier for amplifying said light-receiving signal input from said light-receiving device; and a signal processing circuit for generating, based on said light-receiving signal amplified by said amplifier, data concerning storage information or structure information of said object.

2. A photodetector apparatus according to claim 1, wherein said optical system further comprises a polarization selecting system which selectively transmits therethrough a predetermined polarization component included in each of said first and second light beams, and selectively sets oscillation mode of optical amplification which is effected by said semiconductor light amplifier device due to said second light beam incident thereon in a feedback manner.

3. A photodetector apparatus according to claim 2, wherein said polarization selecting system is a polarizing filter made of a birefringent crystal.

4. A photodetector apparatus according to claim 1, wherein said semiconductor light amplifier device comprises a light-emitting device having a gain-waveguide type stripe structure or narrow stripe structure whose carrier density is localized at a center portion of said device.

5. A photodetector apparatus according to claim 4, wherein said semiconductor light amplifier device is a superluminescence diode.

6. A photodetector apparatus according to claim 4, wherein said semiconductor light amplifier device has a slant optical waveguide structure in which direction of the optical waveguide is set so as to be tilted with respect to the direction of a resonator.

7. A photodetector apparatus according to claim 4, wherein said semiconductor light amplifier device has a cut-off optical waveguide structure forming an optical waveguide which is away from said first exit end.

8. A photodetector apparatus according to claim 9, wherein said first driving circuit adjusts, based on the light-receiving signal input from said light-receiving device, an injection current supplied to said semiconductor light amplifier device as said first driving signal, so as to constantly maintain the light quantity of said first light beam emitted from said semiconductor amplifier device.

9. A photodetector apparatus according to claim 1, wherein said light-receiving device detects, as said third light beam, a light beam emitted from a second exit end which is opposed to said first exit end in said semiconductor light amplifier device.

10. A photodetector apparatus according to claim 9, wherein said light-receiving device detects, as said third light beam, a part of said first light beam emitted from said semiconductor light amplifier device.

11. A photodetector apparatus according to claim 10, wherein said optical system further comprises a half mirror which is disposed in an optical path between said semiconductor device and said object so as to guide to said light-receiving device a part of said first light beam emitted from said semiconductor light amplifier device.

12. A photodetector apparatus comprising:
a first driving circuit which outputs a first driving signal;
a semiconductor light amplifier device which emits, from a first exit end arranged to yield no reflection, a first light beam having a light quantity corresponding to said first driving signal input from said first driving circuit, and optically amplifies said first light beam based on a second light beam which is incident on said first exit end in a feedback manner as return light from an object to be measured which is irradiated with said first light beam;
an optical system which irradiates said object with said first light beam incident thereon from said semiconductor light amplifier device, and makes said second light beam, which is incident thereon from said object, incident on said semiconductor light amplifier device in a feedback manner;
a light receiving device which detects a third light beam emitted from said semiconductor light amplifier device with a light quantity in proportion to the light quantity of said first light beam, and outputs a light-receiving signal corresponding to the light quantity of said third light beam;

an amplifier for amplifying said first driving signal input from said first driving circuit; and
a signal processing circuit for generating, based on said first driving signal amplified by said amplifier, data concerning storage information or structure information of said object; wherein
said first driving circuit adjusts, based on the light-receiving signal input from said light-receiving device, an injection current supplied to said semiconductor light amplifier device as said first driving signal, so as to constantly maintain the light quantity of said first light beam emitted from said semiconductor amplifier device; and
said first driving circuit adjusts, based on the light-receiving signal input from said light-receiving device, an injection current supplied to said semiconductor light amplifier device as said first driving signal, so as to constantly maintain the light quantity of said first light beam emitted from said semiconductor amplifier device.

13. A photodetector apparatus comprising:
a first driving circuit which outputs a first driving signal;
a semiconductor light amplifier device which emits, from a first exit end arranged to yield no reflection, a first light beam having a light quantity corresponding to said first driving signal input from said first driving circuit, and optically amplifies said first light beam based on a second light beam which is incident on said first exit end in a feedback manner as return light from an object to be measured which is irradiated with said first light beam;
an optical system which irradiates said object with said first light beam incident thereon from said semiconductor light amplifier device, and makes said second light beam, which is incident thereon from said object, incident on said semiconductor light amplifier device in a feedback manner;
a light receiving device which detects a third light beam emitted from said semiconductor light amplifier device with a light quantity in Proportion to the light quantity of said first light beam, and outputs a light-receiving signal corresponding to the light quantity of said third light beam;
an amplifier for amplifying said light-receiving signal input from said light-receiving device or said first driving signal input from said first driving circuit; and
a signal processing circuit for generating, based on said light-receiving signal or first driving signal amplified by said amplifier, data concerning storage information or structure information of said object.

14. A photodetector apparatus according to claim 13, wherein said first driving circuit supplies a constant injection current to said semiconductor light amplifier device as said first driving signal.

15. A photodetector apparatus according to claim 13, further comprising a second driving circuit which outputs a second driving signal; an actuator which adjusts, based on said second driving signal input from said second driving circuit, focal position of an objective lens included in said optical system; and a controller which controls respective operations of said first and second driving circuits, and outputs positional information of said object to said signal processing circuit.

16. A photodetector apparatus according to claim 15, further comprising a displacement sensor which measures displacement of said objective lens and outputs a detection signal thereof to said second driving circuit, wherein said second driving circuit adjusts, based on the detection signal input from the displacement sensor, said second driving signal, so as to effect a displacement error compensation for said objective lens.

17. A photodetector apparatus according to claim 15, further comprising a third driving circuit which outputs a third driving signal; and a stage which adjusts, based on said third driving signal input from said third driving circuit, position of said object, said controller further controlling operation of said third driving circuit.

* * * * *

UNITED STATES PATENT AND TRADEMARK OFFICE
CERTIFICATE OF CORRRECTION

PATENT NO. : 5,808,746  
DATED : September 15, 1998  
INVENTOR(S) : Koishi, et al.

Page 1 of 2

It is certified that error appears in the above-identified patent and that said Letters Patent is hereby corrected as shown below:

On the title page, under item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 8 | 2 | 7 | 3 | 5 | 01/1993 | Kurtz | | | |
| | | 5 | 2 | 2 | 3 | 7 | 2 | 2 | 06/1993 | Nagai | | | |
| | | 4 | 3 | 6 | 4 | 1 | 1 | 8 | 12/1982 | Maeda | | | |
| | | 5 | 6 | 1 | 9 | 5 | 2 | 1 | 04/1997 | Tanaka | | | |
| | | 4 | 9 | 5 | 8 | 3 | 5 | 5 | 09/1990 | Alphonse | | | |
| | | 4 | 8 | 5 | 6 | 0 | 1 | 4 | 08/1989 | Figueroa | | | |
| | | 4 | 7 | 9 | 4 | 6 | 0 | 8 | 12/1988 | Fujita | | | |
| | | 5 | 3 | 9 | 6 | 4 | 8 | 1 | 03/1995 | Uchida | | | |
| | | 4 | 8 | 6 | 0 | 2 | 7 | 6 | 08/1989 | Ukita | | | |

UNITED STATES PATENT AND TRADEMARK OFFICE
CERTIFICATE OF CORRRECTION

PATENT NO. : 5,808,746
DATED : September 15, 1998
INVENTOR(S) : Koishi, et al.

Page 2 of 2

It is certified that error appears in the above-identified patent and that said Letters Patent is hereby corrected as shown below:

FOREIGN PATENT DOCUMENTS

|   |   | DOCUMENT NUMBER |   |   |   |   |   | PUBLICATION DATE | COUNTRY OR PATENT OFFICE | CLASS | SUBCLASS | TRANSLATION YES | NO |
|---|---|---|---|---|---|---|---|---|---|---|---|---|---|
|   |   | 0 | 4 | 0 | 3 | 30 | 8 | A2 | 12/1990 | EP |   |   |   |   |
|   |   | 0 | 5 | 3 | 2 | 24 | 1 | A2 | 03/1993 | EP |   |   |   |   |
|   |   |   |   |   |   |   |   |   |   |   |   |   |   |   |

OTHER DOCUMENTS

| | Mitsuhashi et al., "Self-Coupled Optical Pickup", April 1976, pages 95-97 |
|---|---|
| | |

Signed and Sealed this

Twenty-seventh Day of April, 1999

Attest:

Q. TODD DICKINSON

*Attesting Officer*

*Acting Commissioner of Patents and Trademarks*